US005494539A

United States Patent [19]
Tsujimura et al.

[11] Patent Number: 5,494,539
[45] Date of Patent: Feb. 27, 1996

[54] METAL MEMBER QUALITY IMPROVING METHOD BY SPOT WELDING

[75] Inventors: Hiroshi Tsujimura; Yasumasa Tamai; Masayuki Kurihara; Seiichi Toyoda, all of Hitachi; Yutaka Watanabe, Kitaibaraki; Koichi Kurosawa, Hitachi, all of Japan

[73] Assignees: Hitachi, Ltd., Tokyo; Hitachi Kyowa Kogyo Co, Ltd., Ibaraki, both of Japan

[21] Appl. No.: 297,051

[22] Filed: Aug. 29, 1994

[30] Foreign Application Priority Data

Aug. 30, 1993 [JP] Japan ................................. 5-214143

[51] Int. Cl.⁶ ................................................. C21D 9/50
[52] U.S. Cl. ........................... 148/522; 148/526; 148/529; 148/524
[58] Field of Search ..................... 148/521, 522, 148/524, 526, 529, 611, 525

[56] References Cited

U.S. PATENT DOCUMENTS 4,247,037  1/1981  Tamai et al. .
4,562,332  12/1985  Walter et al. .
5,022,936  6/1991  Tsujimura et al. .
5,227,124  7/1993  Saito et al. .

FOREIGN PATENT DOCUMENTS 59-21711    5/1984   Japan .
59-21711    5/1984   Japan .
62-263888   11/1987  Japan .
2258190     10/1990  Japan .
3170093     7/1991   Japan .

Primary Examiner—Deborah Yee
Attorney, Agent, or Firm—Antonelli, Terry, Stout & Kraus

[57] ABSTRACT

By applying spot welding along a crack which has occurred in an austenitic stainless steel structure without use of welding material so that spot welds are connected, melting and solidifying of the crack can be achieved, thereby to provide a metal structure which is rich with delta ferrite of the austenitic stainless steel structure or prevent propagation of the crack by enclosing it into the interior of the austenitic stainless steel structure.

21 Claims, 8 Drawing Sheets

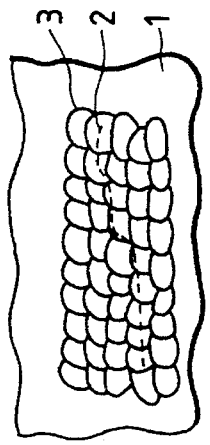
FIG. 19
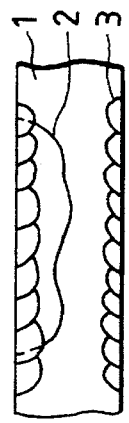
FIG. 22
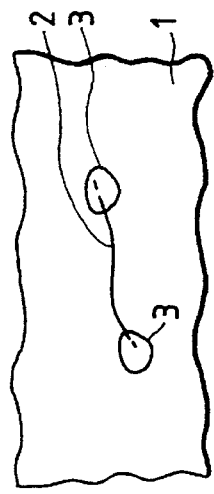
FIG. 21
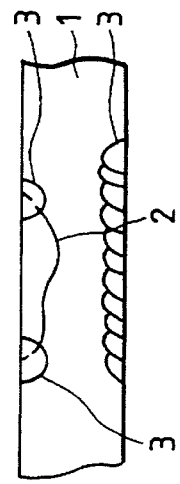
FIG. 20
FIG. 23
| | CURRENT (A) | VOLTAGE (V) | WELDING SPEED (mm/min) | WELDING TIME (sec) | HEAT INPUT (kJ/cm) | INTER-PASS TIME (min) |
|---|---|---|---|---|---|---|
| CONTINUOUS WELDING 1 | 150 | 10 | 60 | — | 15 | 5 |
| CONTINUOUS WELDING 2 | 150 | 10 | 90 | — | 10 | 5 |
| SPOT WELDING | 150 | 10 | — | 5 | — | 5 |

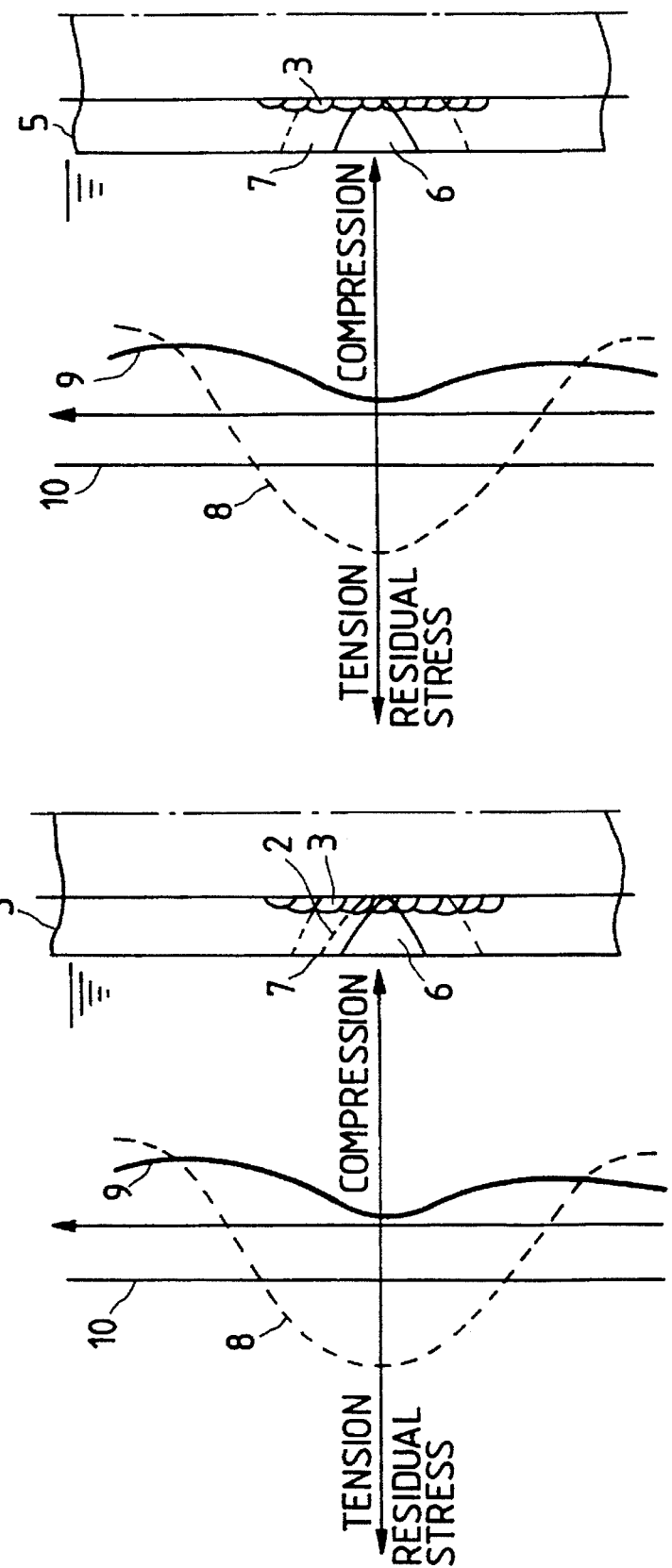

1

METAL MEMBER QUALITY IMPROVING METHOD BY SPOT WELDING

BACKGROUND OF THE INVENTION

The present invention relates to a method of improving, by spot welding, the quality of an austenitic stainless steel, the quality of which is degraded due to deterioration of its metal structure or cracking.

Occurrence of stress corrosion cracking in a structure made of austenitic stainless steel (hereunder referred to as a SUS structure) degrades the quality of the SUS structure. In order to improve the quality it is necessary to repair the SUS structure which has the cracking.

FIG. 32 is a diagram for explanation of the occurrence of stress corrosion cracking, and FIG. 33 is a sectional view of a butt-welded portion of a pipe and residual stress distribution in the section of the butt-welded portion.

As a conventional repairing technique when cracking has occurred in a SUS structure, in general, there is used a method of removing a cracked region by a device, such as a grinder, forming an edge-opening, and then welding the region for repairing it, or a method of melting the cracked region by continuous welding and then finishing the weld bead.

Further, an intergranular stress corrosion crack (hereunder, referred to as a SCC), which occurs at a welding heat affected zone of a nuclear reactor primary piping of SUS 304 in a BWR plant, occurs at the portion of high tensile stress 13 above 10 kgf/mm$^2$, a chromium-depleted zone 14 formed along a grain boundary due to welding heat which causes sensitivity in the material, and at corrosive environment 15 of dissolved oxygen, etc.; and, these areas overlap, for example, to form a stress corrosion cracking occurrence region 16, as seen in FIG. 32.

In FIG. 33, a SUS piping 5 is welded to form a weld portion 6, with natural cooling, that is, without using forcible cooling, such as by causing water to flow in the piping.

In this case, as is apparent from a standard line or +10 kgf/mm$^2$ line 10 in FIG. 33, such a high residual tensile stress reaching to several ten kgf/mm$^2$ occurs in the inner surface of the piping.

Further, a chromium-depleted zone occurs in a welding heat affected zone 7, in this manner, when corrosive fluid flows along outer and inner side surfaces of the SUS piping 5 in which a high residual tensile stress and a chromium-depleted zone occur, and a danger that the SCC may take place in the welding heat affected zone 7 increases.

Therefore, for a machine or apparatus elements which come into contact with corrosive hot and high-pressure water containing therein dissolved oxygen, in particular, for a machine or apparatus elements for a BWR plant, high corrosion resistance is required for securing reliability and maintaining long life.

As one of the available conventional countermeasures for a SCC, a method of cladding corrosion resistive material containing delta ferrite on a surface which comes into contact with corrosive fluid and then applying a melting treatment on the cladded end portions is disclosed in JP B2 59-21711.

Substantially the same method as disclosed in the JP B2 59-21711 is also disclosed in U.S. Pat. No. 4,247,037.

The method extinguishes a chromium-depleted zone formed by heat affection in the cladding of corrosion resistant material and forms a structure containing delta ferrite and having excellent corrosion resistance.

Further, as another available countermeasure for a SCC, a method of applying solution treatment on one side surface of two side surfaces of an object while cooling the opposite side surface with respect to the one side surface is disclosed in JP A 2-258190.

The latter method forms a structure containing delta ferrite and having excellent corrosion resistance by applying the solution treatment on one side surface and reduces residual stress in the other side surface, whereby the corrosion resistance on both side surfaces is increased.

Further, as other countermeasures for a SCC, a method. of mounting a thin cylindrical sleeve on an inner surface of a piping for a BWR plant, and forming a structure containing delta ferrite and having excellent corrosion resistance by applying solution treatment thereon is disclosed in JP A 3-170093.

Substantially the same method as disclosed in JP A 3-170093 is disclosed in U.S. Pat. No. 5,227,124.

U.S. Pat. No. 4,562,332 discloses a technique in which electron beams are applied to cracks in a metal surface in a zigzag fashion to repair the cracks. However, it is not clearly disclosed in this US patent to form on the metal surface a structure containing delta ferrite and having excellent corrosion resistance.

The prior art does not take into consideration the following cases:

(1) a case where an allowable quantity of weld deformation due to repairing is small;

(2) a case where a large depth of weld penetration is required when welding is carried out for repairing a crack because the depth of the crack is deep;

(3) a case where an allowable quantity of undercut at a portion of the welding for repairing a crack is small for the reason that finishing work after the welding for repairing the crack is impossible, etc.;

(4) a case where a large cooling speed is required for prevention of hot cracking during welding and prevention of stress corrosion cracking;

(5) a case where it is necessary to change welding conditions according to the thickness of the welding portion because the thickness of the welding portion changes; and (6) a case where it is impossible to cause cooling water to flow onto a side surface opposite to a surface to be welded for repairing the surface to cool the opposite side surface.

In any of the above cases (1) to (6), repairing work for SUS structures is difficult.

SUMMARY OF THE INVENTION

Therefore, an object of the present invention is to carry out reliable repair of a crack which has occurred in a SUS structure.

A first feature of the invention is directed to a method of improving the quality of a metal member by spot welding, characterized by applying spot welding to a non-through crack and a surface adjacent to the non-through crack which has occurred in a structural member of austenitic stainless steel without use of welding material, so that welded spots are connected, by melting all or part of said non-through crack, and then solidifying the melted portion to form delta ferrite, thereby to repair all of the non-through crack or to repair part of the non-through crack so as to block cracking at a midway portion of said non-through crack in the structural member of austenitic stainless steel.

A second feature of the invention is directed to a method of improving the quality of a metal member by spot welding, characterized by applying spot welding to a portion surrounding a surface of a non-through crack which has occurred in a structural member of austenitic stainless steel without use of welding material so that welded spots are connected, by melting the surrounding portion of said surface of the non-through crack, and then by solidifying the melted portion to form delta ferrite, thereby to enclose the surface in which the non-through crack has occurred by the spot welding and to prevent the non-through crack from propagating.

A third feature of the invention is directed to a method of improving the quality of a metal member by spot welding, characterized by reforming both end portions of a non-through crack into a melting solidification structure to prevent the non-through crack from propagating by applying spot welding to both end portions of the non-through crack which has occurred in a structural member of austenitic stainless steel without use of welding material, by melting the end portions of the non-through crack, and then by solidifying the melted portion to form delta ferrite.

A fourth feature of the invention is directed to a method of improving the quality of a metal member by spot welding, characterized by applying spot welding to the entire surface of a region in which the existence of a non-through crack is presumed in a structural member of austenitic stainless steel in which the existence of a non-through crack is apparent, but in which the propagation course of the crack and the existence region thereof are unclear, without use of welding material so that welded spots are connected, by melting all or part of said non-through crack, and then by solidifying the melted portion to form delta ferrite, thereby to repair all of the non-through crack or to repair part of the non-through crack, so as to block cracking at a midway portion of said non-through crack in the structural member of austenitic stainless steel.

A fifth feature of the invention is directed to a method of improving the quality of a metal member by spot welding, characterized by melting both the face and back side surfaces of a structural member of austenitic stainless steel in which a non-through crack has occurred, by applying spot welding to both surfaces without use of welding material, so that welded spots are connected, and then by solidifying the melted portions to form delta ferrite, thereby to melt and repair all of the non-through crack or to melt part of the non-through crack so as to block cracking at a midway portion of said non-through crack in the structural member of austenitic stainless steel.

A sixth feature of the invention is directed to a method of improving the quality of a metal member by spot welding, characterized by applying spot welding, without use of welding material, to a non-through crack and an adjacent portion to the crack propagating on one surface of the face and back side surfaces of a structure of austenitic stainless steel in which the non-through crack occurs, so that spot welds are joined, and by applying spot welding to the side surface opposite to the one surface so that spot welds are joined, and by melting and then solidifying the welded portions to form delta ferrite therein, thereby to prevent propagation of the non-through crack.

A seventh feature of the invention is directed to a method of improving the quality of a metal member by spot welding, characterized by applying spot welding, without use of welding material, to a portion surrounding a non-through crack propagating in one surface of the face and back side surfaces of a structure of austenitic stainless steel in which the non-through crack occurs so that spot welds are joined, and by applying spot welding to the side surface opposite to the one surface so that spot welds are joined, and by melting and then solidifying both of the face and back side surfaces to form delta ferrite therein, thereby to prevent propagation of the non-through crack.

An eighth feature of the invention is directed to a method of improving the quality of a metal member by spot welding, characterized by spot welding, without use of welding material, both length end portions of a non-through crack propagating in one surface of the face and back side surfaces of a structure of austenitic stainless steel in which the non-through crack occurs, by melting and then solidifying the end portions to form delta ferrite, thereby to reform the end portions, and by applying spot welding to the side surface opposite to the one surface so that spot welds are joined, and melting and then solidifying the opposite side surface to form delta ferrite therein, thereby to prevent propagation of the non-through crack.

A ninth feature of the invention is directed to a method of improving the quality of a metal member by spot welding, characterized by applying spot welding, without use of welding material and so that welded spots are connected, to the entire surface of a region consisting of one of the face and back side surfaces of an austenitic stainless steel structural member in which the existence of a non-through crack is apparent, but in which the propagation course and existence region of the non-through crack are unclear, the region of the one surface being in which the non-through crack may exist being presumed, further by applying spot welding to the side surface opposite to the one surface so that spot welds are connected, and by melting and solidifying both the face and back side surfaces to form delta ferrite, thereby to prevent propagation of the non-through crack.

A tenth feature of the invention is directed to a method of improving the quality of a metal member by spot welding in accordance with any of the first to the ninth features, wherein the spot welding is GTAW or plasma welding.

An eleventh feature of the invention is directed to a method of improving the quality of a metal member by spot welding, characterized by applying spot welding without use of welding material when a non-through crack occurs in a welding heat affected zone in contact with corrosive fluid in a structure of austenitic stainless steel and propagates on one of the face and back side surfaces of the welding heat affected zone of a structure of austenitic stainless steel, in which welding work on the one surface is possible, by melting and then solidifying the non-through crack propagating on the one surface and a portion adjacent thereto to form delta ferrite, and by cooling the side surface opposite to the one surface to reform the non-through crack and the adjacent portion.

A twelfth feature of the invention is directed to a method of improving the quality of a metal member by spot welding, characterized by melting and then solidifying by spot-welding, without use of welding material, one of the face and back surfaces of a welding heat affected portion of a structure of stainless steel, which comes into contact with corrosive fluid, when the one surface is susceptible to welding work, to form delta ferrite, and cooling the side surface opposite to the one surface to reform the surface.

A thirteenth features of the invention is directed a method of improving the quality of a metal member by spot welding, characterized by spot welding the member to clad corrosion resistant alloy on one of the face and back side surfaces of a welding heat affected portion of a structure of stainless steel, which comes into contact with corrosive fluid, when the one surface is susceptible to welding work, and by cooling the side surface opposite to the one surface to reform the surface.

A fourteenth feature of the invention is directed to a method of improving the quality of a metal member by spot welding in accordance with the thirteenth feature, wherein, when a melting deficient portion is produced in the melting portion of the corrosion resistant alloy, said melting deficient portion is melted and then solidified to form delta ferrite by spot welding without use of welding material, and the side surface opposite to the one surface is cooled to reform the melting deficient portion.

A fifteenth feature of the invention is directed to a method of improving the quality of a metal member by spot welding in accordance with the thirteenth or fourteenth features, wherein the corrosion resistant alloy is any alloy defined in JIS Z3321 Y308L and JIS Z3321 Y316L (AWS A 5.9 ER 308L and ER316L (American Welding Society standard)).

A sixteenth feature of the invention is directed to a method of improving the quality of a metal member by spot welding in accordance with any of the eleventh to the fourteenth features, wherein the spot welding is GTAW or plasma welding.

BRIEF DESCRIPTION OF THE DRAWINGS

FIG. 19 is a plan view of a SUS structure, similar to FIG. 7, which is repaired according to the present invention;

FIG. 20 is a sectional view of the SUS structure taken along the line of a non-through crack 2 shown in FIG. 19;

FIG. 21 is a plan view of a SUS structure, similar to FIG. 9, which is repaired according to the present invention;

FIG. 22 is a sectional view of the SUS structure taken along the line of a non-through crack 2 in FIG. 21;

FIG. 23 is a table showing various conditions of spot welding and continuous welding;

FIG. 28 is a diagrammatic sectional view of piping which is repaired according to the present invention and a graph showing residual stress conditions of an adjacent portion of the repaired portion of the piping, the position of the piping in the sectional view corresponding to the position of piping in the graph;

FIG. 29 is a diagrammatic sectional view of piping which is repaired according to the present invention and a graph showing residual stress conditions of an adjacent portion of the repaired portion of the piping, the position of the piping in the sectional view corresponding to the position of piping in the graph;

DESCRIPTION OF THE PREFERRED EMBODIMENTS

In all of the embodiments of the present invention, spot welding is applied to a SUS structure (a structure made of stainless steel) to improve the quality of the SUS structure. The spot welding is non-filler GTAW, and the SUS structure is welded by the non-filler GTAW.

In all of the embodiments, sufficient penetration was attained, undercut did not occur and the SUS structure was substantially not deformed. Further, since the cooling speed was large, a hot crack did not occur and the spot welding could be applied in a small sensitivity range. Namely, deformation caused when a non-through crack which has occurred in an inner surface of SUS piping is repaired by spot welding without use of welding material is shown by a curved line A in FIG. 24, the penetration depth is shown by a bar graph at the right in FIG. 25, the undercut is substantially zero as compared with continuous welding as shown in FIG. 26 and the cooling speed is as shown by a curved line A in FIG. 27.

In any of FIGS. 24 to 27, both the case of repairing by spot welding and the case of repairing by continuous welding are shown for ease of comparison. Conditions of spot welding and conditions of continuous welding operation are listed in the table of FIG. 23.

Figure 24:
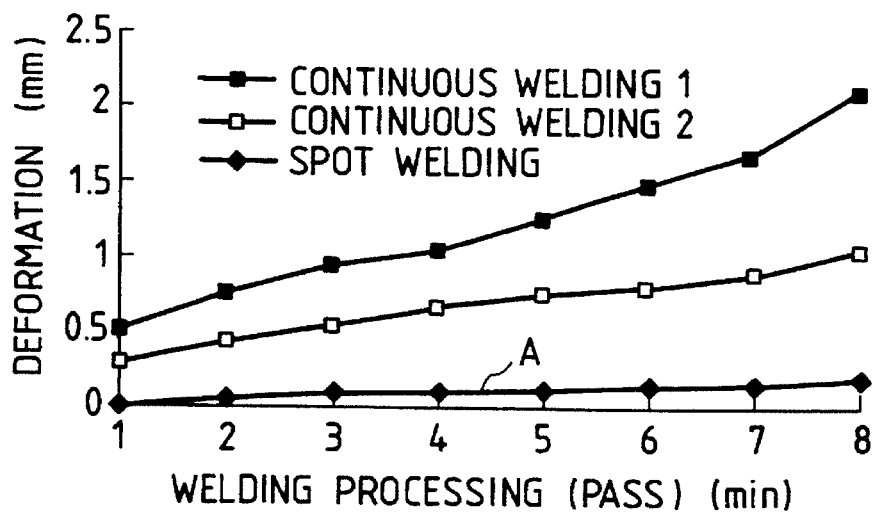
FIG. 24 is a graph showing a change in deformation according to welding processing under various welding methods.

Comparative study results of each welding are as follows:

(a) Deformation by spot welding is very small, that is, less than about ⅒, as compared with that by continuous welding 1, and less than about ⅕ as compared with that by continuous welding 2, as shown in FIG. 24.

Figure 25:
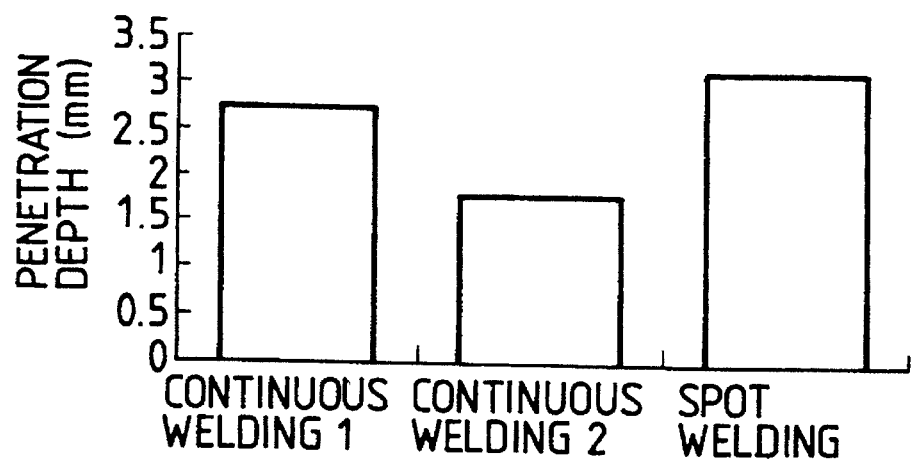
FIG. 25 is a graph showing penetration depth according to various welding methods.
Figure 26:
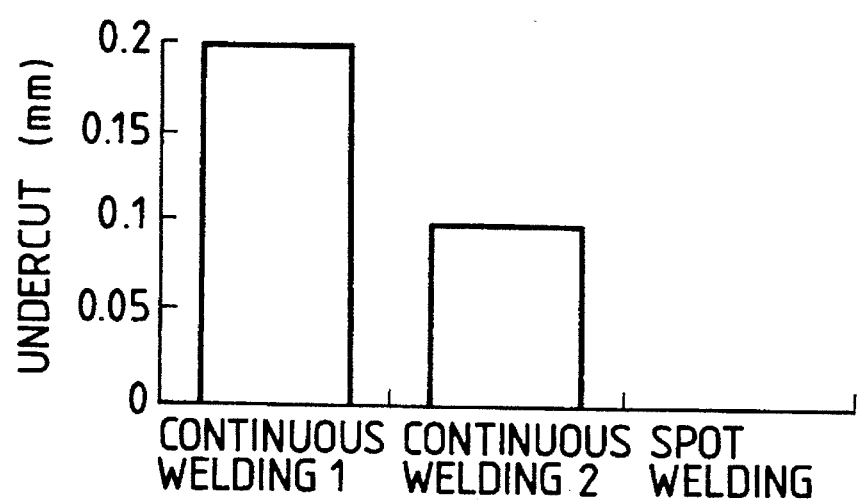
FIG. 26 is a bar graph showing amounts of undercut according to various welding methods.

(b) Penetration depth by spot welding is deeper than by any continuous welding, as shown in FIG. 25.

(c) Undercut by spot welding is smaller than by any continuous welding, as shown in FIG. 26.

Figure 27:
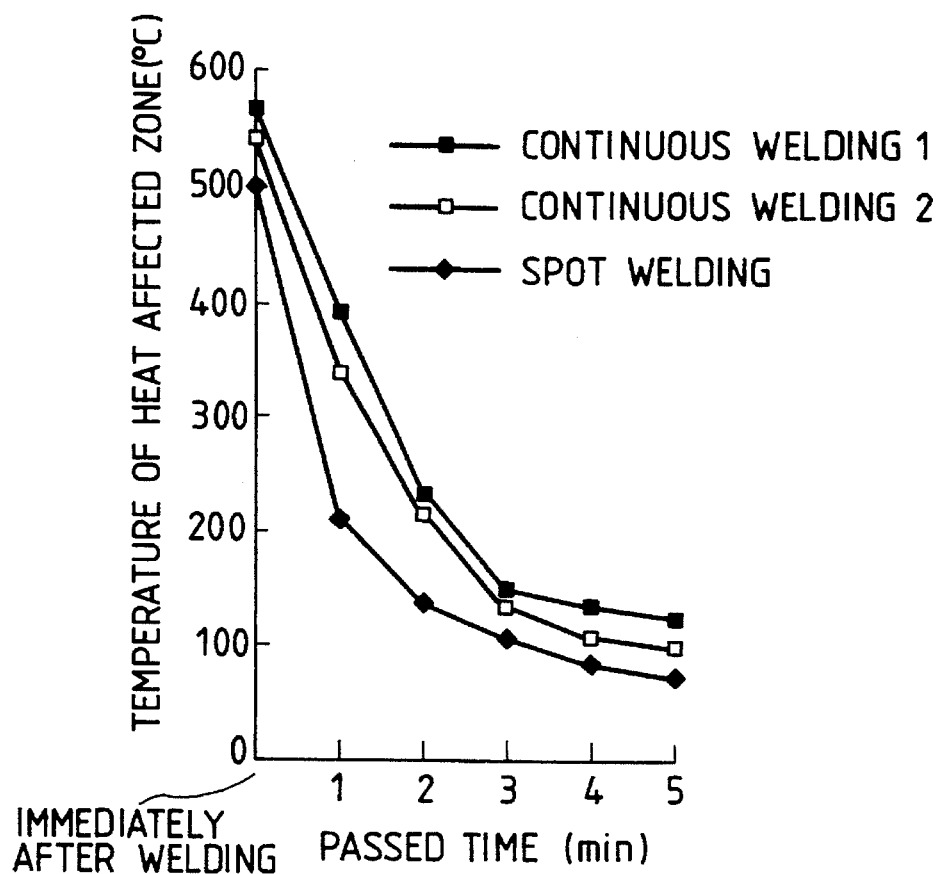
FIG. 27 is a graph showing a change in temperature of a heat-affected zone according to the passage of time.

(d) Cooling speed in spot welding is larger than in any continuous welding, as shown in FIG. 27.

As indicated above, it is apparent that a repairing method using spot welding is much more desirable than repairing by any continuous welding operation.

Figure 1:
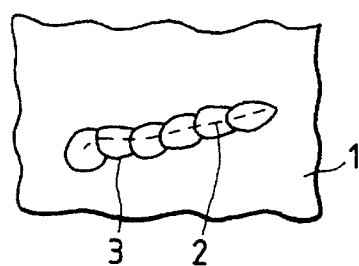
FIG. 1 is a plan view of a SUS structure (a structure made of stainless steel) which is repaired according to the present invention.
Figure 2:
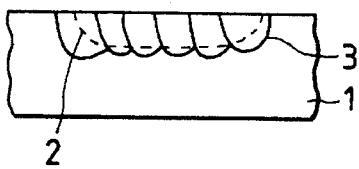
FIG. 2 is a sectional view of the SUS structure taken along the line of a non-through crack 2 in FIG. 1.

An embodiment of the present invention is shown in FIGS. 1 and 2. In this embodiment, by applying spot welding to a surface of SUS structure 1 at the side where an end of a non-through crack exists along the line of a non-through crack 2 without use of welding material or filler so that spot welds 3 are connected or joined, the entire length of the non-through crack 2 is melted and the non-through crack 2 disappears.

Figure 3:
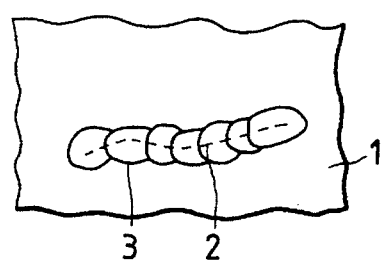
FIG. 3 is a plan view of another SUS structure which is repaired according to the present invention.
Figure 4:
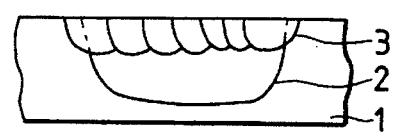
FIG. 4 is a sectional view of the SUS structure taken along the line of a non-through crack 2 in FIG. 3.

A SUS structure, having a deep non-through crack 2, is shown in FIGS. 3 and 4. In this case, applying spot welding to a surface of the SUS structure 1 at the side where the non-through crack 2 exists and along the non-through crack 2 without use of welding material so that spot welds 3 are connected or joined as shown in FIGS. 3, 4, only a part of the non-through crack 2 which is adjacent to the surface is melted, whereby the non-through crack 2 is enclosed into the SUS structure 1.

Figure 5:
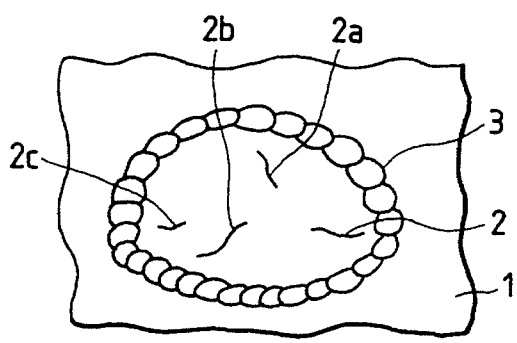
FIG. 5 is a plan view of a further SUS structure which is repaired according to the present invention.
Figure 6:
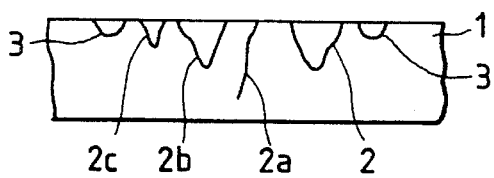
FIG. 6 is a schematic diagram in which each non-through crack and the spot welding traces of the SUS structure shown in FIG. 5 are concentrated and shown on a cross section of the SUS structure.

A SUS structure, having a plurality of non-through cracks 2, 2a, 2b and 2c, is shown in FIGS. 5 and 6. In this case, by applying spot welding to a surface of the SUS structure 1 on which ends of a plurality of non-through cracks 2, 2a, 2b, 2c appear without use of welding material so that spot welds 3 are formed in a closed loop so as to enclose the area of the plurality of non-through cracks 2, 2a, 2b, 2c, the non-through cracks 2, 2a, 2b, 2c are prevented from propagating to an area outside of the enclosed region by the spot welds 3.

Figure 7:
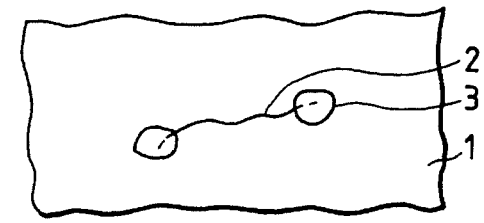
FIG. 7 is a plan view of still another SUS structure which is repaired according to the present invention.
Figure 8:
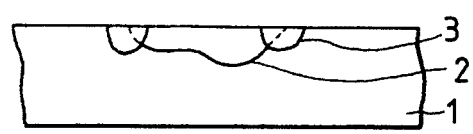
FIG. 8 is a sectional view of the SUS structure taken along the line of a non-through crack 2 in FIG. 7.

A SUS structure, having a non-through crack 2, is shown in FIGS. 7 and 8. In this case, spot welds 3 by spot welding without use of welding material are provided at both ends of the non-through crack 2 which has occurred in the SUS structure 1 at a surface side in which an end of the non-through crack 2 appears, whereby both the ends of the non-through crack 2 are reformed into a fusion solidification structure and propagation of the non-through crack 2 is prevented.

Figure 9:
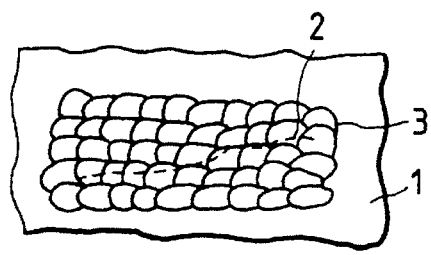
FIG. 9 is a plan view of still a further SUS structure which is repaired according to the present invention.
Figure 10:
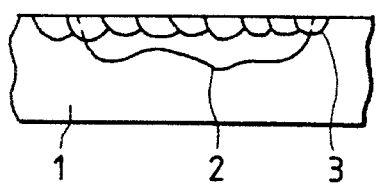
FIG. 10 is a sectional view of the SUS structure taken along the line of a non-through crack 2 in FIG. 9.

A SUS structure, having a deep non-through crack 2 whose course is unclear, is shown in FIGS. 9 and 10. In this case, where the course of the non-through crack 2 which has occurred in SUS structure 1 is unclear, but the non-through crack 2 is presumed to exist in a certain range, by applying spot welding to a surface of the SUS structure at the side where an end of the non-through crack 2 appears without use of welding material so that spot welds are formed vertically and laterally and joined over a selected area, all the surface of the SUS structure 1 in the deduced range is melted, whereby the non-through crack 2 is blocked or enclosed into the SUS structure 1, even when the crack is deep.

Figure 11:
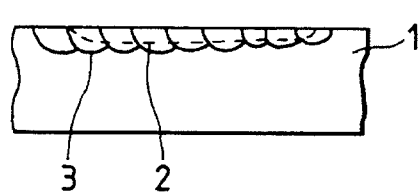
FIG. 11 is a sectional view taken along the line of a non-through crack 2 in another SUS structure which is repaired according to the present invention.

A SUS structure, having a shallow non-through crack 2 whose course is unclear, is shown in FIG. 11. In this case, where the course of the non-through crack 2 which has occurred in SUS structure 1 is unclear but the non-through crack 2 is presumed to exist in a certain range, by applying spot welding to a surface of the SUS structure at the side where an end of the non-through crack 2 appears without use of welding material so that spot welds are formed vertically and laterally and joined over a selected area, all the surface of the SUS structure 1 in the presumed range is melted and the non-through crack 2 which exists in a region close to the surface of the SUS structure disappears.

Figure 12:
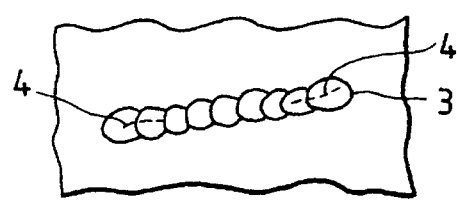
FIG. 12 is a plan view of a further SUS structure which is repaired according to the present invention.
Figure 13:
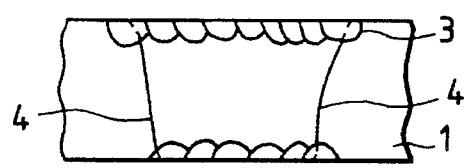
FIG. 13 is a sectional view of the SUS structure taken along the line extending through non-through cracks 4 in FIG. 12.

A SUS structure, having a pair of through cracks 4, is shown in FIGS. 12 and 13. In this case, by applying spot welding to both the face and back side surfaces of the SUS structure 1 in which a through crack 4 has occurred without use of welding material so that spot welds 3 are placed along a line extending between the ends of the through cracks 4 on both the face and back side surfaces of the SUS structure 1, both ends of the through cracks 4 are melted, and the through cracks 4 are blocked or enclosed into the SUS structure 1.

Figure 14:
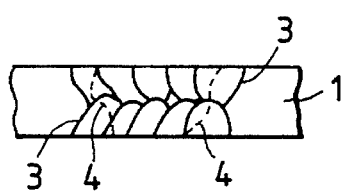
FIG. 14 is a sectional view taken along a line extending through non-through cracks 4 in a SUS structure which is repaired according to the present invention.

A SUS structure, similar to FIGS. 12 and 13, but of less thickness, is shown in FIG. 14. In this case, by applying a deep spot welding to both of the face and back side surfaces of the SUS structure 1 in which a pair of through cracks 4 has occurred without use of welding material so that spot welds 3 are placed along a line extending between the ends of the through cracks 4 on both the face and back side surfaces of the SUS structure 1, the entire length of the through cracks 4 are melted so as to disappear.

Figure 15:
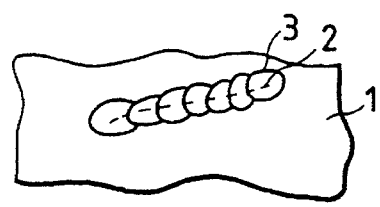
FIG. 15 is a plan view of a SUS structure, similar to FIG. 3, which is repaired according to the present invention.
Figure 16:
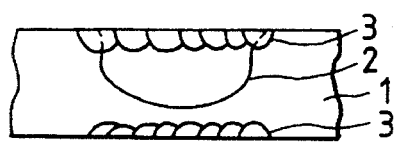
FIG. 16 is a sectional view of the SUS structure taken along the line of a non-through crack 2 in FIG. 15.

A SUS structure, similar to that of FIGS. 3 and 4, is shown in FIGS. 15 and 16. In this case, by applying spot welding, on one of the face and back side surfaces of a SUS structure 1 to which a non-through crack 2 propagates, a line between the ends of along the non-through crack 2, without use of welding material, so that spot welds 3 are joined, each end of the non-through crack 2 is melted, and by further applying spot welding to the surface opposite to the one surface without use of welding material, so that spot welds 3 are joined, the metal structure of the opposite surface is changed in its property into a fusion solidification structure, and the non-through crack 2 is prevented from propagating therethrough. In this way, since the metal structure of the opposite surface of the SUS structure 1 is reformed into a fusion solidification structure, the non-through crack 2 is prevented from propagating so as to become a through crack.

Figure 17:
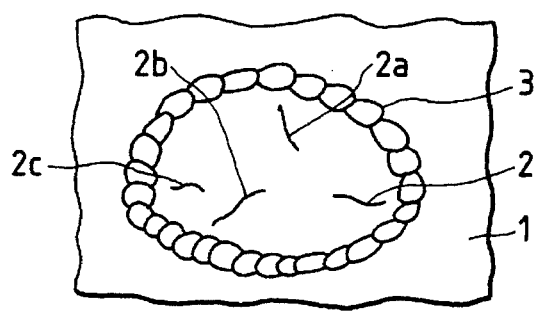
FIG. 17 is a plan view of a SUS structure, similar to FIG. 5, which is repaired according to the present invention.
Figure 18:
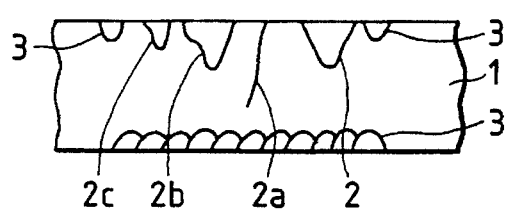
FIG. 18 is a schematic diagram in which each non-through crack and the spot welding traces of the SUS structure shown in FIG. 17 are concentrated and shown on a cross section of the SUS structure.

A SUS structure, similar to FIGS. 5 and 6, is shown in FIGS. 17 and 18. In this case, by applying spot welding to one of the face and back side surfaces of a SUS structure 1 on which a plurality of non-through cracks 2, 2a, 2b, 2c propagate, without use of welding material, so that spot welds 3 are formed in a closed loop so as to surround the non-through cracks, the non-through cracks 2 are enclosed by the spot welds 3, and by further applying spot welding to the surface opposite to the one surface without use of welding material so that spot welds 3 are joined, the metal structure of the opposite surface is reformed into a fusion solidification structure, and the non-through cracks 2, 2a, 2b, 2c are prevented from propagating outside of the enclosed range and from changing from non-through cracks to through cracks.

A SUS structure, similar to FIGS. 7 and 8, is shown in FIGS. 19 and 20. In this case, by applying spot welding to one of the face and back side surfaces of the SUS structure 1, on which a non-through crack 2 propagates at both ends of the non-through crack 2, without use of welding material, both ends of the non-through crack 2 are melted, and by further applying spot welding to the surface opposite to the one surface without use of welding material so that spot welds 3 are joined, the metal structure of the opposite side surface is reformed into a fusion solidification structure, and the non-through crack 2 can be prevented from propagating, in particular, from changing from a non-through crack to a through crack.

A SUS structure, similar to FIGS. 9 and 10, is shown in FIGS. 21 and 22. In this case, when the course of a non-through crack 2 which has occurred in the SUS structure 1 is unclear, but the non-through crack 2 is presumed to exist in a certain range, and in case the non-through crack 2 extends to a one of the face and back side surfaces of the SUS structure 1 at the ends thereof, by applying spot welding to all the surface over a range in which the non-through crack 2 is presumed to exist at the side of the one surface of the SUS structure without use of welding material, so that spot welds 3 are formed vertically and laterally over a selected area, all of the surface of the SUS structure 1 in the presumed range is melted, and by further applying spot welding to the side surface opposite to the one surface without use of welding material so that spot welds 3 are placed vertically and laterally and joined over a similar selected area, the opposite side surface is reformed into a fusion solidification structure and the non-through crack 2 can be prevented from propagating, in particular, from changing from a non-through crack 2 to a through crack.

Each of examples shown in FIGS. 28 to 31 is an example in which the present invention is applied to a welding heat affected portion of SUS piping. In each of these examples, there are shown both a section of a SUS piping after melting of a crack has occurred in an inner surface of the SUS piping by applying spot welding without use of welding material, so that spot welds are connected, while cooling an outer surface of the SUS piping, and a residual stress distribution line in the section. A dotted line 8 showing the residual stress distribution represents residual stress before applying spot welding, a solid line 9 represents residual stress after applying spot welding, and a standard line 10 represents +10 kgf/cm² which is a standard of occurrence of stress corrosion cracking.

In FIG. 28, spot welding is applied to a non-through crack 2 which has occurred at welding heat affected portion 7 surrounding the welded portion 6 in an inner surface of a SUS piping 5 to melt the heat affected portion 7 by spot welds 3, and to change the inner surface into fusion solidification structure; and, further, the outer surface of the SUS piping 5 is cooled with air or water, whereby residual stress in the outer surface of the SUS piping 5 is improved from tension to compression to be less than the standard line 10 of +10 kgf/cm², which is apparent from comparison of the residual stress 8 before applying spot welding and the residual stress 9 after applying spot welding.

In FIG. 29, spot welding is applied to a welding heat affected portion 7 surrounding the welded portion 6 in an inner surface of a SUS piping 5 to melt the heat affected portion 7 by spot welds 3, and to change the inner surface into a fusion solidification structure; and, further, the outer surface of the SUS piping 5 is cooled with air or water, whereby residual stress in the outer surface of the SUS piping 5 is improved from tension to compression to be less than the standard line 10 of +10 kgf/cm², which is apparent from comparison of the residual stress 8 before applying spot welding and the residual stress 9 after applying spot welding.

Figure 30:
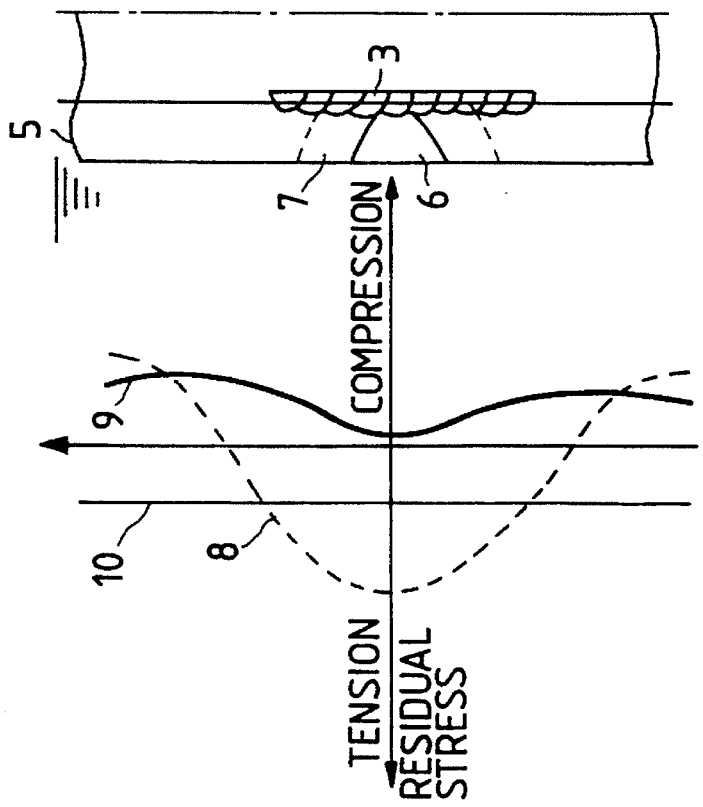
FIG. 30 is a diagrammatic sectional view of piping which is repaired according to the present invention and a graph showing residual stress conditions of an adjacent portion of the repaired portion of the piping, the position of the piping in the sectional view corresponding to the position of piping in the graph.
Figure 32:
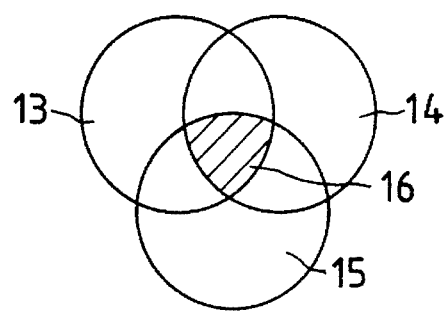
FIG. 32 is a schematic diagram showing stress corrosion and its occurrence factors.
Figure 33:
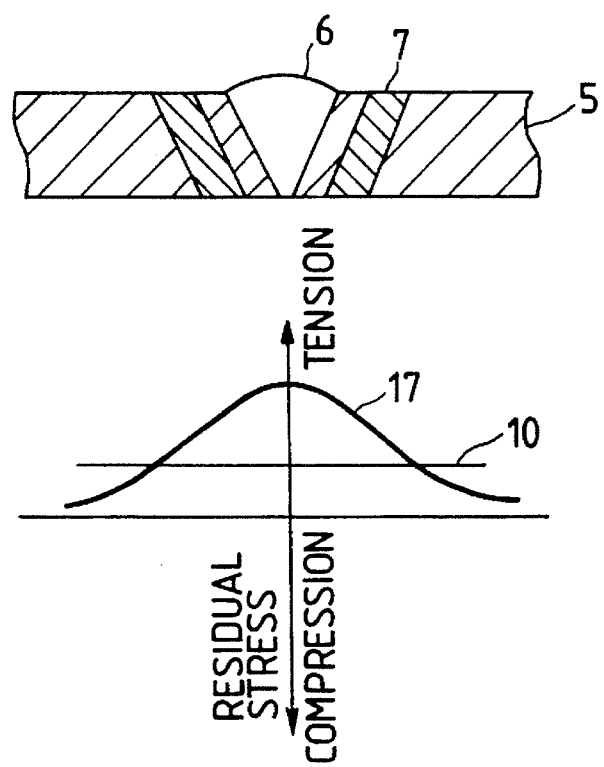
FIG. 33 is a diagrammatic sectional view of a welded portion of piping which has not been repaired and a graph showing residual stress conditions of an adjacent portion of the welded portion of the piping, the position of the piping in the sectional view corresponding to the position of piping in the graph.

In FIG. 30, spot welding is applied to a welding heat affected portion 7 surrounding a welded portion 6 in an inner surface of a SUS piping 5 from the inner surface to clad the inner surface with corrosion resistant alloy by spot welds 3, and to change the inner surface into a structure having excellent corrosion resistance; and, further, the outer surface of the SUS piping 5 is cooled with air or water, whereby residual stress in the outer surface of the SUS piping 5 is improved from tension to compression to be less than the standard line 10 of +10 kgf/cm², which is apparent from comparison of the residual stress 8 before applying spot welding and the residual stress 9 after applying spot welding.

Figure 31:
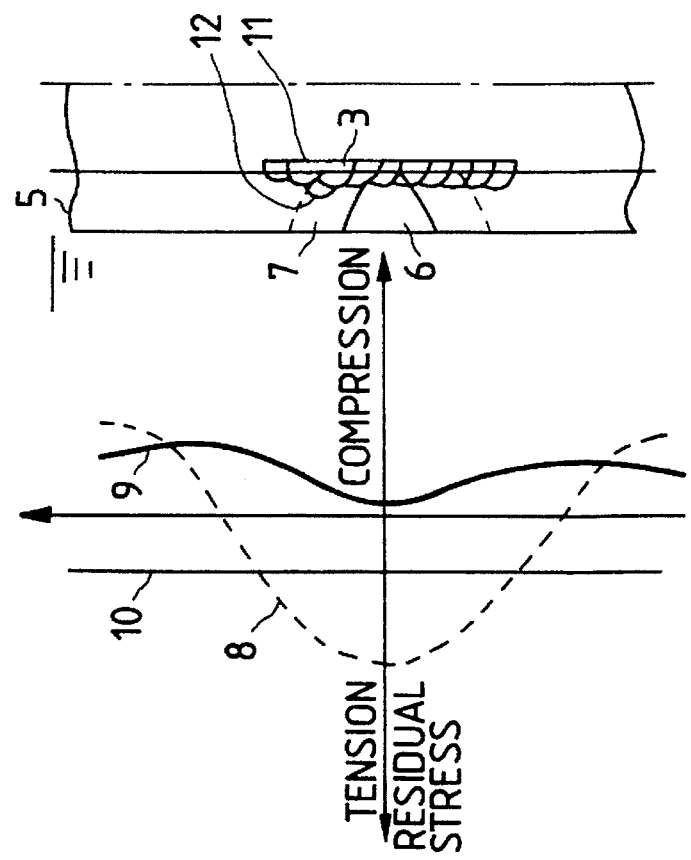
FIG. 31 is a diagrammatic sectional view of piping which is repaired according to the present invention and a graph showing residual stress conditions of an adjacent portion of the repaired portion of the piping, the position of the piping in the sectional view corresponding to the position of piping in the graph.

In FIG. 31, in case a melting deficiency portion 11 is produced when the corrosion resistant alloy is cladded on the inner surface by the spot welds 3 in the example of FIG. 30, the melting deficient portion 11 is melted by spot welds 12 and the outer surface of the SUS piping 5 is cooled with air or water, whereby the melting deficient portion 11 is improved, while maintaining the residual stress of compression in the outer surface.

According to the examples of FIGS. 28 through 31, by repairing a crack in the inner surface of a SUS piping 5, the inner surface can be changed into a fusion solidification structure, or into a structure having excellent corrosion resistance, and, at the same time, the residual stress in the outer surface of the SUS piping 5 can be improved from tension to compression.

In the examples of FIGS. 30 and 31, an alloy having any of the standards JIS Z3321 Y3081 and JIS Z3321 Y316L is employed as the corrosion resistant alloy.

In all of the examples of the present invention, the spot welding is effected by GTAW, and the welding conditions are 1 A to 500 A, 0.1 V to 20 V, 0.1 sec to 10 sec. In all of the examples of the present invention, the spot welding can be effected by plasma welding instead of using the GTAW. In case plasma welding is used, welding conditions are such that characteristics of the spot welding as shown in FIGS. 24 to 27 can be reproduced. In all of the examples of the present invention, an austenitic stainless steal is changed to a new fusion solidification structure by applying spot welding to the austenitic stainless steal. In the fusion solidification structure, delta ferrite is produced.

The present invention has an effect in maintenance and repairing of a piping, a barrel and an end plate of SUS in a plant which has been built, under conditions in which the face and back side surfaces thereof are in contact with high temperature, high pressure water containing dissolved oxygen. The invention also is effective when it is used for apparatus and devices of a nuclear power plant and structural elements thereof used under an environment in which SCC occurs.

Application of the present invention to a SUS structure produces the following effects.

(1) Propagation of a crack can be prevented by melting along the crack, or by melting a portion close to the crack to block or seal the crack. Further, in this case, welding deformation substantially does not occur at all in a SUS structure, and deep penetration without undercut can be attained. Still further, since the cooling speed is large, hot cracking and sensitivity of the material can be prevented.

(2) By melting a non-through crack, which has occurred in a welding heat affected portion of the face and back side surfaces which are in contact with a corrosive fluid, and melting one of the two surfaces to reform it into a fusion solidification structure, and by cooling the opposite surface with air or water, residual stress in the opposite surface can be improved into compression residual stress.

(3) By melting one of the face and back side surfaces of a welding heat affected portion, which face and back side surfaces are in contact with a corrosive fluid, to reform it into a fusion solidification structure, and by cooling the opposite side surface with air or water, residual stress in the opposite side surface can be improved into compression residual stress.

(4) By cladding a corrosion resistant alloy on one of the face and back side surfaces of a welding heat affected portion, which face and back side surfaces are in contact with corrosive fluid, to reform it into a structure having excellent corrosion resistance, and by cooling the opposite surface with air or water, residual stress in the opposite surface can be improved into compression residual stress.

What is claimed is:

1. A method of improving the quality of a structural metal member of austenitic stainless steel containing a non-through crack by spot welding, comprising the steps of:

applying spot welding to a non-through crack and to a surface adjacent to the non-through crack which is present in said structural member of austenitic stainless steel without use of welding material to form respective spot welds, so that welded spots thereof are connected and all or a part of said non-through crack is melted; and then solidifying the melted portion to form delta ferrite, thereby to repair all of the non-through crack or to repair part of the non-through crack to block cracking at a midway portion of said non-through crack to prevent propagation thereof into the structural member of austenitic stainless steel.

2. A method of improving the quality of a metal member containing a non-through crack by spot welding, comprising the steps of:

applying spot welding to a portion surrounding a surface having at least one non-through crack in a structural member of austenitic stainless steel without use of welding material, so that welded spots are connected in a ring surrounding said at least one non-through crack, melting the surrounding portion of said surface surrounding the non-through crack; and then solidifying the melted portion to form delta ferrite, thereby to enclose said surface in which the non-through crack is located by the spot welding to prevent the non-through crack from propagating.

3. A method of improving the quality of a metal member containing a non-through crack by spot welding, comprising the steps of:

reforming both end portions of a non-through crack located in a structural member of austenitic stainless steel into a fusion solidification structure to prevent the non-through crack from propagating by applying spot welding to the end portions of the non-through crack without use of welding material, thereby melting the end portions of the non-through crack; and then solidifying the melted portion to form delta ferrite.

4. A method of improving the quality of a metal member containing a non-through crack by spot welding, comprising the steps of:

applying spot welding to all of the surface of a region in which existence of a non-through crack is presumed in a structural member of austenitic stainless steel and in which existence of the non-through crack is apparent, but in which a propagation course and an existence region thereof are unclear, to form a plurality of welded spots without use of welding material, so that said welded spots are connected, melting all or part of said non-through crack; and then solidifying the melted portion to form delta ferrite, thereby to repair all the non-through crack or to repair part of the non-through crack to block a cracking in a midway portion of said non-through crack from propagating into the structural member of austenitic stainless steel.

5. A method of improving the quality of a metal member containing a non-through crack by spot welding, comprising the steps of:

melting both face and back side surfaces of a structural member of austenitic stainless steel in which a non-through crack is present by applying spot welding to both surfaces without use of welding material, so that welded spots are connected; and then solidifying the melted portions to form delta ferrite, thereby to melt and repair all the non-through crack or to melt part of the non-through crack to block a cracking at a midway portion of said non-through crack from propagating into the structural member of austenitic stainless steel.

6. A method of improving the quality of a metal member containing a non-through crack by spot welding, comprising the steps of:

applying spot welding, without use of welding material, to a non-through crack and a portion adjacent to the crack propagating on one of the face and back side surfaces of a structure of austenitic stainless steel in which the non-through crack is located, so that spot welds are joined;

applying spot welding to the opposite side surface to the one side surface so that spot welds are joined to effect melting of the surface; and then solidifying the welded portions to form delta ferrite therein, thereby to prevent propagation of the non-through crack.

7. A method of improving the quality of a metal member containing a non-through crack by spot welding, comprising the steps of:

applying spot welding, without use of welding material, to a portion surrounding a non-through crack propagating on one of the face and back side surfaces of a structure of austenitic stainless steel in which the non-through crack is located, so that spot welds are joined;

applying spot welding to the side surface opposite to the one surface so that spot welds are joined to effect melting of the surface; and then solidifying both of the face and back side surfaces to form delta ferrite therein, thereby to prevent propagation of the non-through crack.

8. A method of improving the quality of a metal member containing a non-through crack by spot welding, comprising the steps of:

spot welding, without use of welding material, both end portions of a non-through crack propagating on one of the face and back side surfaces of a structure of austenitic stainless steel in which the non-through crack occurs to effect melting of the surface;

solidifying the end portions to form delta ferrite, thereby to reform the surface at said end portions;

applying spot welding to the side surface opposite to the one surface so that spot welds are joined to effect melting of the surface; and then solidifying the opposite side surface to form delta ferrite therein, thereby to prevent propagation of the non-through crack.

9. A method of improving the quality of a metal member containing a non-through crack by spot welding, comprising the steps of:

applying spot welding, without use of welding material and so that welded spots are connected, to the entire surface of a region of one of the face and back side surfaces of an austenitic stainless steel structural member in which the existence of a non-through crack is apparent, but in which a propagation course and an existence region of the non-through crack are unclear, the region of said one surface being presumed to be that in which the non-through crack may exist;

further applying spot welding to the side surface opposite to said one surface so that spot welds on the face and back surfaces are connected to effect melting of the surface; and solidifying both the side surfaces to form delta ferrite, thereby to prevent propagation of the non-through crack.

10. A method of improving the quality of a metal member by spot welding according to any of claims 1 to 9, wherein the spot welding is GTAW or plasma welding.

11. A method of improving the quality of a metal member containing a non-through crack by spot welding, comprising the steps of:

applying spot welding, without the use of welding material, when a non-through crack is present in a welding heat affected zone in contact with corrosive fluid in a structure of austenitic stainless steel and propagates on one of the face and back side surfaces of the welding heat affected zone of the structure of austenitic stainless steel, in which welding work on said one surface is possible to effect melting of the surface;

then solidifying the non-through crack propagating on said one surface and a surface portion adjacent thereto to form delta ferrite; and cooling the side surface opposite to said one surface to reform surface at the non-through crack and the adjacent portion.

12. A method of improving the quality of a metal member by spot welding, comprising the steps of:

melting and then solidifying a region, to form delta ferrite by spot-welding to form a plurality of spot welds which are connected with one another, without use of welding material, on one of the face and back side surfaces of a welding heat affected portion of a structure of stainless steel, which comes into contact with corrosive fluid; and cooling the side surface opposite to said one surface.

13. A method of improving the quality of a metal member by spot welding, comprising the steps of:

spot welding to clad a corrosion resistant alloy on one of the face and back side surfaces of a welding heat affected portion of a structure of stainless steel, which comes into contact with corrosive fluid; and cooling the side surface opposite to said one surface.

14. A method of improving the quality of a metal member by spot welding according to claim 13, wherein when a melting deficient portion is present in the melting portion of the corrosion resistant alloy, said melting deficient portion is melted and then solidified to form delta ferrite by spot welding without use of welding material, and the side surface opposite to said one surface is cooled to reform said melting deficient portion.

15. A method of improving the quality of a metal member by spot welding according to claim 13 or claim 14, wherein the corrosion resistant alloy is any alloy defined in AWS A 5.9 ER308L and ER3321 Y316L.

16. A method of improving the quality of a metal member by spot welding according to any of claims 11 to 14, wherein the spot welding is GTAW or plasma welding.

17. A method of repairing a metal member of austenitic stainless steel having at least one non-through crack by welding, said method comprising the steps of:

applying spot welding, without use of welding material, to a limited region on a surface of the metal member on which said at least one non-through crack is present so as to melt the limited region which is linked with welded spots, the limited region including at least one region of a crack region of said at least one non-through crack present on the surface of the metal member and a surrounding region surrounding the crack region; and then solidifying the limited region of welded spots to form delta ferrite, thereby to repair the metal member so as to prevent propagation of said at least one crack.

18. The method according to claim 17, wherein in the surrounding region, the welded spots are connected in a ring surrounding said at least one non-through crack.

19. The method according to claim 17, wherein the limited region is fully covered with welded spots.

20. The method according to claim 17, further including the steps of applying spot welding to an opposite surface of the surface of the metal member in a corresponding region to the limited region of the surface of the metal member to melt the corresponding region; and then solidifying the melted corresponding region to form delta ferrite.

21. A method of repairing a metal member of austenitic stainless steel having at least one through crack by welding, said method comprising the steps of:

applying spot welding, without use of welding material, to limited regions on respective surfaces of the metal member on which said at least one non-through crack is present so as to melt the limited regions each of which is linked with welded spots, the limited regions each including at least one region of a crack region of said at least one through crack present on the surface of the metal member and a surrounding region surrounding the crack region; and then solidifying the limited regions of welded spots to form delta ferrite, thereby to repair the metal member so as to prevent propagation of said at least one crack.

* * * * *